(12) United States Patent
Park et al.

(10) Patent No.: US 10,360,165 B2
(45) Date of Patent: Jul. 23, 2019

(54) DISPLAY DEVICE AND METHOD OF DRIVING THE SAME

(71) Applicant: Samsung Display Co. Ltd., Yongin-si (KR)

(72) Inventors: Jin Kyu Park, Yongin-si (KR); Kyung Uk Choi, Gunpo-si (KR); Joon Chul Goh, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/793,608

(22) Filed: Oct. 25, 2017

(65) Prior Publication Data

US 2018/0165235 A1 Jun. 14, 2018

(30) Foreign Application Priority Data

Dec. 8, 2016 (KR) ........................ 10-2016-0166705

(51) Int. Cl.
*G06F 13/38* (2006.01)
*G09G 3/20* (2006.01)
*H02J 7/00* (2006.01)

(52) U.S. Cl.
CPC ............ *G06F 13/385* (2013.01); *G06F 13/38* (2013.01); *G09G 3/2092* (2013.01); *G09G 2330/021* (2013.01); *G09G 2370/045* (2013.01); *G09G 2370/12* (2013.01); *H02J 2007/0062* (2013.01)

(58) Field of Classification Search
CPC ...... G06F 13/385; G06F 13/38; G09G 3/2092
USPC .......................................................... 710/72
See application file for complete search history.

(56) References Cited

U.S. PATENT DOCUMENTS

| | | | | |
|---|---|---|---|---|
| 6,557,170 B1 * | 4/2003 | Wilder | ..................... | G06F 1/266 345/168 |
| 6,678,005 B2 * | 1/2004 | Anderson | .......... | H04N 5/44513 348/473 |
| 7,636,130 B2 * | 12/2009 | Chang | ..................... | H04N 5/268 348/553 |
| 9,431,841 B2 | 8/2016 | Inha et al. | | |
| 2002/0175924 A1 * | 11/2002 | Yui | ........................... | G06F 3/14 345/660 |
| 2003/0107566 A1 * | 6/2003 | Shin | ........................ | G06F 1/266 345/212 |

(Continued)

FOREIGN PATENT DOCUMENTS

KR 1020080082301 9/2008

*Primary Examiner* — Paul R. Myers
(74) *Attorney, Agent, or Firm* — Cantor Colburn LLP

(57) ABSTRACT

A display device includes a first connector which receives a first image signal and first driving power, a second connector which receives a second image signal and second driving power, a first control unit which processes the first image signal and the first driving power, a second control unit which processes the second image signal and the second driving power, a power management unit which receives the first and second driving powers from the first control unit and the second control unit, measures the first and second driving powers, and provides information about the first driving power and information about the second driving power to the first and second control units, and a display unit which receives one of the first and second image signals from one of the first and second control units and displays one of the first and second image signals.

20 Claims, 12 Drawing Sheets

(56) References Cited

U.S. PATENT DOCUMENTS

| | | | | |
|---|---|---|---|---|
| 2007/0241990 A1* | 10/2007 | Smith | .................... | G09G 5/003 |
| | | | | 345/5 |
| 2008/0126629 A1* | 5/2008 | Huang | .................. | G06F 1/3203 |
| | | | | 710/64 |
| 2008/0307123 A1* | 12/2008 | Cheng | .................. | G06F 13/385 |
| | | | | 710/31 |
| 2009/0079814 A1* | 3/2009 | Hsu | ........................ | H04N 5/268 |
| | | | | 348/14.08 |
| 2010/0211709 A1* | 8/2010 | Chen | ........................ | G06F 3/023 |
| | | | | 710/73 |
| 2016/0005378 A1* | 1/2016 | Abe | ........................ | G09G 5/003 |
| | | | | 345/520 |
| 2017/0308498 A1* | 10/2017 | Chen | .................... | G06F 13/385 |

\* cited by examiner

DISPLAY DEVICE AND METHOD OF DRIVING THE SAME

This application claims priority to Korean Patent Application No. 10-2016-0166705, filed on Dec. 8, 2016, and all the benefits accruing therefrom under 35 U.S.C. § 119, the content of which in its entirety is herein incorporated by reference.

BACKGROUND

1. Field

Exemplary embodiments of the invention relate to a display device and a method of driving the same.

2. Description of the Related Art

A display device is mainly used to display an image transmitted from an external device on a screen.

Generally, a display device includes a digital video interface ("DVI") connector, a D-sub connector, a high-definition multimedia interface ("HDMI") connector, etc., for receiving images from external devices. To transmit an image to a monitor, an external device also includes a DVI connector, a D-sub connector, an HDMI connector, or the like corresponding to a connector of the display device and a cable connected to the connector.

It is also possible to receive an image from an external device using a universal serial bus ("USB") connector and a cable connected to the USB connector to display the received image on the display device.

However, while an image signal can be received from an external device using the above-described connectors, a separate cable for supplying power to the display device is desired. In this case, a cable for transmitting an image signal and a cable for supplying power are separately desired, which may cause inconvenience in an installation and use of the display device.

In order to solve the inconvenience of the installation and use of the display device, a structure in which an image signal and power can be simultaneously supplied through one cable and one connector is desired.

SUMMARY

In a structure in which an image signal and power can be simultaneously supplied using one connector, when a display device includes a plurality of connectors, various types of power and image signals may be simultaneously supplied to the display device through the connectors. Here, various types of power and image signals can collide with each other, thus causing problems.

Therefore, there is a need for a display device including a plurality of connectors but capable of being driven in real time in such a way that various types of image signals or power provided simultaneously through the connectors do not collide with each other.

Exemplary embodiments of the invention provide a display device including a plurality of connectors and capable of being driven in real time in such a way that various types of image signals or driving power provided simultaneously through the connectors do not collide with each other, and a method of driving the display device.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, there is provided a display device. The display device includes a first connector which receives a first image signal and first driving power, a second connector which receives a second image signal and second driving power, a first control unit which processes the first image signal and the first driving power provided through the first connector, a second control unit which processes the second image signal and the second driving power provided through the second connector, a power management unit which receives the first driving power and the second driving power from the first control unit and the second control unit, measures the first driving power and the second driving power, and provides information about the first driving power and information about the second driving power to the first control unit and the second control unit, and a display unit which receives the first image signal or the second image signal from the first control unit or the second control unit and displays the first image signal or the second image signal.

According to another exemplary embodiment of the invention, there is provided a display device. The display device includes a first connector which receives a first image signal and first driving power, a second connector which receives a second image signal and second driving power, a display unit which displays an image corresponding to the first image signal or the second image signal, where the first connector and the second connector conform to a universal serial bus ("USB") standard, and the display unit is driven by the first driving power or the second driving power.

According to another exemplary embodiment of the invention, there is provided a method of driving a display device. The method of driving the display device includes a first connector, a second connector and a display unit, the method including, receiving an image signal and driving power through each of the first connector and the second connector, measuring a voltage level of the driving power, providing the driving power to the display unit and the first or second connector to which the driving power has not been provided when the voltage level of the driving power is higher than a reference voltage level, and providing the image signal provided from the first connector or the second connector to the display unit.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
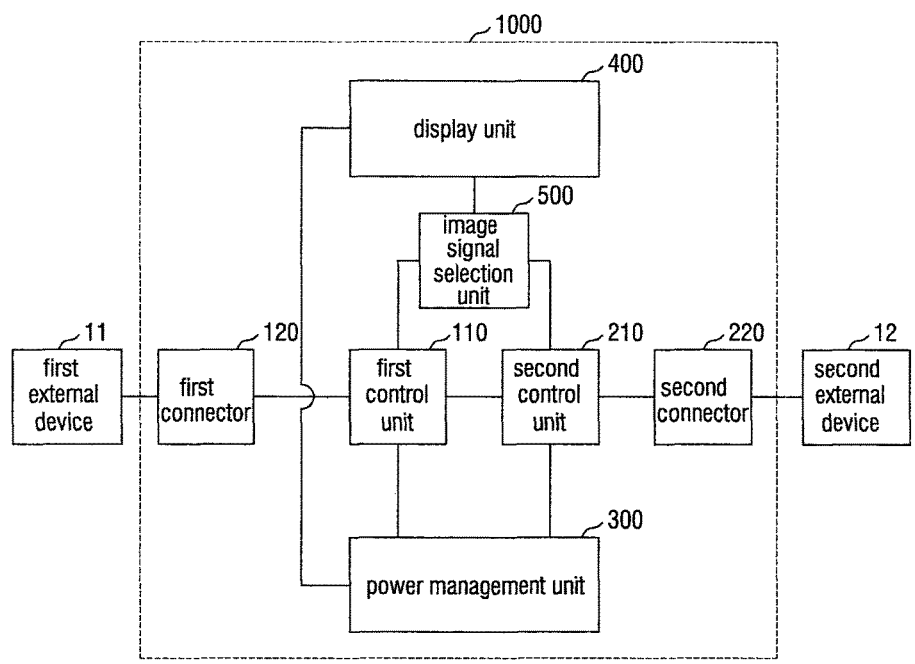
FIG. 1 is a block diagram of an embodiment of a display device.

The invention will now be described more fully hereinafter with reference to the accompanying drawings, in which preferred exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. The same reference numbers indicate the same components throughout the specification. In the attached drawing figures, the thickness of layers and regions is exaggerated for clarity.

It will be understood that when an element is referred to as being "on" another element, it can be directly on the other element or intervening elements may be therebetween. In contrast, when an element is referred to as being "directly on" another element, there are no intervening elements present.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. In an exemplary embodiment, a region illustrated or described as flat may, typically, have rough and/or non-linear features. Moreover, sharp angles that are illustrated may be rounded. Thus, the regions illustrated in the figures are schematic in nature and their shapes are not intended to illustrate the precise shape of a region and are not intended to limit the scope of the claims.

In the invention, an electronic apparatus may be any apparatus provided with a display device. Examples of the electronic apparatus may include smart phones, mobile phones, navigators, game machines, televisions ("TVs"), car head units, notebook computers, laptop computers, tablet computers, personal media players ("PMPs"), and personal digital assistants ("PDAs"). The electronic apparatus may be embodied as a pocket-sized portable communication terminal having a wireless communication function. Further, the display device may be a flexible display device capable of changing its shape.

Hereinafter, exemplary embodiments of the invention will be described with reference to the attached drawings.

FIG. 1 is a block diagram of a display device 1000 according to an exemplary embodiment.

Referring to FIG. 1, the display device 1000 includes a first connector 120 and a second connector 220 which are respectively connected to external devices 11 and 12, a first control unit 110 which controls the first connector 120, a second control unit 210 which controls the second connector 220, a power management unit 300 which manages power supplied to the first control unit 110 and the second control unit 210, a display unit 400 which displays an image, and an image signal selection unit 500 which selects an image signal to be provided to the display unit 400.

Here, the external devices 11 and 12 may be a personal computer ("PC"), a notebook computer or a tablet PC capable of providing both driving power and an image signal, or may be an adapter capable of providing only the driving power. The PC, the notebook computer or the tablet PC can also provide only the image signal to the display device 1000. Other various electronic devices capable of providing both driving power and image signals, only the driving power, or only the image signals can also be included as examples of the external devices 11 and 12.

The first connector 120 and the second connector 220 may be respectively connected to the external devices 11 and 12 and receive driving power and/or an image signal from the external devices 11 and 12. That is, the first connector 120 may simultaneously receive driving power and an image signal, receive only the driving power, or receive only the image signal through one cable. The second connector 220 may simultaneously receive driving power and an image signal, receive only the driving power, or receive only the image signal through one cable.

Figure 2:
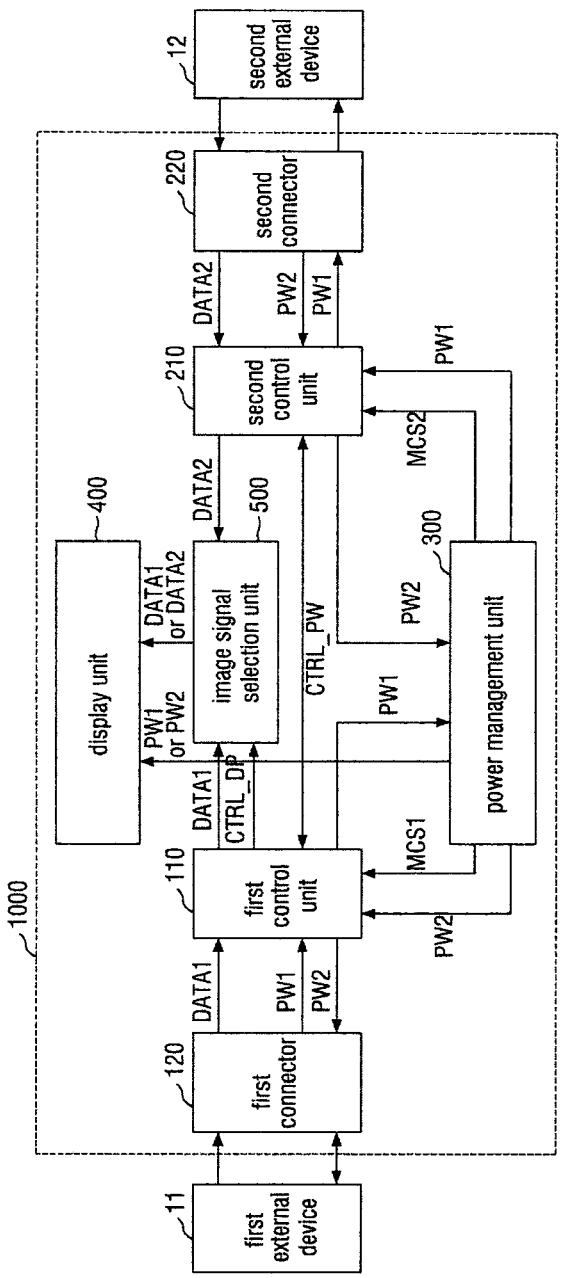
FIG. 2 is a more detailed block diagram of the embodiment of the display device FIG. 1.

To distinguish driving power and an image signal provided through the first connector 120 from those provided through the second connector 220, driving power provided through the first connector 120 will be referred to as first driving power PW1 (refer to FIG. 2), and an image signal provided through the first connector 120 will be referred to as a first image signal DATA1 (refer to FIG. 2). Likewise, driving power provided through the second connector 220 will be referred to as second driving power PW2 (refer to FIG. 2), and an image signal provided through the second connector 220 will be referred to as a second image signal DATA2 (refer to FIG. 2), The first connector 120 and the second connector 220 may be connectors conforming to the universal serial bus ("USB") standard. In an exemplary embodiment, the first connector 120 and the second connector 220 may be connectors conforming to the USB Type-C standard, for example. A connector conforming to the USB Type-C standard has the advantage of easy connection since there is no distinction between the front and back of the connector. In addition, the connector may have a data transmission capability of more than 20 gigabits per second (Gbps) and a power transmission and reception capability of more than 100 watts (W). The connector may also be compatible with USB standards prior to USB Type-C standard. However, the first connector 120 and the second connector 220 are not limited to connectors conforming to the USB Type-C standard, and any connector capable of simultaneously providing driving power and an image signal can also function as each of the first connector 120 and the second connector 220 according to an exemplary embodiment.

The first control unit 110 is connected to the first connector 120 and processes driving power and various signals provided through the first connector 120. In an exemplary embodiment, the first control unit 110 may be an integrated circuit ("IC") chip and include a microprocessor and a plurality of multiplexers, for example.

When the first connector 120 is a connector that meets the USB Type-C standard, the first control unit 110 may be a controller that meets the USB Type-C standard. In this case, the first control unit 110 may negotiate whether an external device 11 connected to the first connector 120 will function as a host that supplies driving power or as a device that requires the driving power. In addition, the first control unit 110 may process an image signal received from the external device 11 and provide the processed image signal to another element inside the display device 1000. In an exemplary embodiment, a connector conforming to the USB Type-C standard may include 24 pins, and one of the 24 pins may be a channel configuration ("CC") pin, for example. In an exemplary embodiment, the CC pin may be a single-ended, byphase mark code ("BMC")-encoded 4b/5b signal used for negotiation, for example. That is, a driving power supply test may be performed through the CC pin to determine whether the external device 11 connected to the first connector 120 will function as a host or a device. Through continued negotiation, however, the external device 11 functioning as a host can be changed to function as a device while being connected to the first connector 120, and vice versa.

The second control unit 210 is connected to the second connector 220 and processes driving power and various signals provided through the second connector 220. That is, the second control unit 210 may perform the same role as that of the first control unit 110, and the display device 1000 may include a pair of the first connector 120 and the first control unit 110 and a pair of the second connector 220 and the second control unit 210, that is, two connectors and two control units.

The first control unit 110 and the second control unit 210 may exchange a control signal with each other. Due to the control signal exchanged between the first control unit 110 and the second control unit 210, the first control unit 110 and the second control unit 210 can smoothly perform their respective roles without collision. That is, the first control unit 110 and the second control unit 210, which are respectively connected to the first connector 120 and the second connector 220 and perform the same function, can exchange a control signal that enables the first control unit 110 and the second control unit 210 to adjust their roles in real time without colliding with each other. The control signal will be described in more detail later.

The power management unit 300 receives and manages the first driving power PW1 and the second driving power PW2 provided to the first control unit 110 and the second control unit 210. That is, the power management unit 300 may measure a voltage level of the first driving power PW1 and a voltage level of the second driving power PW2 to check whether each of the first driving power PW1 and the second driving power PW2 provides a sufficient voltage to drive the display unit 400 and to check whether each of the first driving power PW1 and the second driving power PW2 provides a sufficient voltage to charge an external device 12 connected to the second connector 220 or an external device 11 connected to the first connector 120. In addition, the power management unit 300 may provide the first driving power PW1 or the second driving power PW2 to the display unit 400 and provide a control signal for controlling the operation mode of each of the first control unit 110 and the second control unit 210 to be changed. The power management unit 300 will be described in more detail later.

The image signal selection unit 500 may select one of image signals provided through the first connector 120 and the second connector 220, and send the selected image signal to the display unit 400. The image signal selection unit 500 may include a plurality of multiplexers. The image signal selection unit 500 may receive a control signal from the first control unit 110 and/or the second control unit 210 and select an image signal corresponding to the received control signal.

The display unit 400 displays an image corresponding to an image signal provided from external devices 11 and 12. The display unit 400 may be driven by the first driving power PW1 or the second driving power PW2 received from the power management unit 300 and display an image corresponding to a first image signal DATA1 or a second image signal DATA2 received from the image signal selection unit 500. The first driving power PW1 or the second driving power PW2 does not need to be provided from the power management unit 300. Depending on the role of the first control unit 110 or the second control unit 210, the first driving power PW1 or the second driving power PW2 can also be provided directly from the first control unit 110 or the second control unit 210.

The transmission of power and signals between the elements of the display device 1000 will now be described in more detail.

FIG. 2 is a more detailed block diagram of the display device 1000 according to the exemplary embodiment of FIG. 1.

Referring to FIG. 2, the first connector 120 may receive the first driving power PW1 and/or the first image signal DATA1 from a first external device 11 and provide the first driving power PW1 and/or the first image signal DATA1 to the first control unit 110. In addition, the first connector 120 may receive the second driving power PW2 from the first control unit 110.

The first connector 120 may receive the first driving power PW1 from the first external device 11 and provide the first driving power PW1 to the second control unit 210 or may receive the second driving power PW2 from the first control unit 110 and provide the second driving power PW2 to the first external device 11. However, the invention is not limited to the above cases, and the first connector 120 may also not receive the first driving power PW1 from the first external device 11 and may also not provide the second driving power PW2 to the first external device 11.

The transmission of the first image signal DATA1 from the first external device 11 to the first connector 120 and the transmission of the first driving power PW1 or the second driving power PW2 between the first external device 11 and the first connector 120 may be performed independently. In an exemplary embodiment, the first connector 120 may charge the first external device 11 by providing the second driving power PW2 to the first external device 11 at the same time as receiving the first image signal DATA1 from the first external device 11. Conversely, the first connector 120 may receive the first driving power PW1 from the first external device 11 at the same time when the first connector 120 does not receive the first image signal DATA1 from the first external device 11. In an alternative exemplary embodiment, a combination of various operations can be performed.

The second connector 220 may operate similarly to the first connector 120. That is, the second connector 220 may receive the second driving power PW2 and/or the second image signal DATA2 from a second external device 12 and provide the second driving power PW2 and/or the second image signal DATA2 to the second control unit 210. In addition, the second connector 220 may receive the first driving power PW1 from the second control unit 210. Other features of the second connector 220 are similar to those of the first connector 120, and thus a description of the features will be omitted.

The first control unit 110 may provide the first driving power PW1 received from the first connector 120 to the power management unit 300 so that the voltage level of the first driving power PW1 can be measured. The first control unit 110 may provide the first image signal DATA1 received from the first connector 120 to the image signal selection unit 500 so that the first image signal DATA1 can be selectively provided to the display unit 400. In addition, the first control unit 110 may provide an image selection control signal CTRL_DP to the image signal selection unit 500. The first control unit 110 may also exchange a power control signal CTRL_PW with the second control unit 210.

The first control unit 110 may receive a first mode change control signal MCS1 and the second driving power PW2 from the power management unit 300. However, the second driving power PW2 is not necessarily received from the power management unit 300 and can also be received directly from the second control unit 210.

Various signals exchanged between the first control unit 110 and other elements will hereinafter be described.

First, the first control unit 110 may exchange the power control signal CTRL_PW with the second control unit 210 as described above. Here, the power control signal CTRL_PW may be a signal for controlling the first control unit 110 and the second control unit 210 to share their roles and preventing a collision in operation modes of the first control unit 110 and the second control unit 210. One or more terminals included in the first control unit 110 may be connected to one or more terminals included in the second control unit 210 through a bus. By exchanging the power control signal CTRL_PW, the first control unit 110 and the second control unit 210 can adjust the role of an external device 11 connected to the first connector 120 and the role of an external device 12 connected to the second connector 220.

In an exemplary embodiment, when the first control unit 110 determines that the first external device 11 will operate as a host as a result of negotiating with the first external device 11 connected to the first connector 120, the first control unit 110 may inform the second control unit 210 about the determination result using the power control signal CTRL_PW, for example. The second control unit 210 receiving the information indicating that the first external device 11 connected to the first connector 120 will operate as a host may operate in a mode corresponding to the case where the first external device 11 is a host. In an exemplary embodiment, when the second external device 12 is connected to the second connector 220, the second control unit 210 may charge the second external device 12 using the first driving power PW1 received from the power management unit 300 and cut off the second driving power PW2 provided from the second external device 12. When the second external device 12 is not connected to the second connector 220, the second control unit 210 may stand by to charge the second external device 12 when the second external device 12 is connected to the second connector 220. The specific operation of the first control unit 110 may be determined in view of not only the power control signal CTRL_PW exchanged with the second control unit 210 but also the first mode change control signal MCS1 provided by the power management unit 300. This will be described in detail later.

The first control unit 110 may provide the image selection control signal CTRL_DP to the image signal selection unit 500. The image selection control signal CTRL_DP may be used by the image signal selection unit 500 to determine whether to provide the first image signal DATA1 received from the first control unit 110 to the display unit 400 or provide the second image signal DATA2 received from the second control unit 210 to the display unit 400.

In an exemplary embodiment, when the first control unit 110 receives the first image signal DATA1 from the first external device 11 through the first connector 120, the first control unit 110 may provide the first image signal DATA1 to the image signal selection unit 500 and, at the same time, provide the image signal selection unit 500 with the image selection control signal CTRL_DP having a voltage level for controlling the image signal selection unit 500 to preferentially provide the first image signal DATA1 received from the first control unit 110 to the display unit 400 over the second image signal DATA2 received from the second control unit 210. In this case, the image signal selection unit 500 may provide the first image signal DATA1 to the display unit 400 even when the image signal selection unit 500 receives the second image signal DATA2 from the second control unit 210, for example. Conversely, when the first image signal DATA1 is not provided through the first connector 120, the first control unit 110 cannot provide the first image signal DATA1 to the image signal selection unit 500. However, the first control unit 110 may provide the image signal selection unit 500 with the image selection control signal CTRL_DP having a voltage level for controlling the image signal selection unit 500 to preferentially provide the second image signal DATA2 received from the second control unit 210 to the display unit 400 over the first image data DATA1 received from the first control unit 110. In this case, when the second image signal DATA2 is provided from the second control unit 210 to the image signal selection unit 500, the display unit 400 may receive the second image signal DATA2 and display an image corresponding to the second image signal DATA2. In an alternative exemplary embodiment, when both the first image signal DATA1 and the second image signal DATA2 are not provided from the first control unit 110 and the second control unit 210 to the image signal selection unit 500, the display unit 400 may not display an image.

Since a signal related to the control of the first driving power PW1 and the second driving power PW2 is not related to the control of the image signal selection unit 500, the image signal selection unit 500 can operate independently regardless of whether the first driving power PW1 and the second driving power PW2 are supplied.

The power management unit 300 may respectively receive the first driving power PW1 and the second driving power PW2 from the first control unit 110 and the second control unit 210 and measure the voltage levels of the first driving power PW1 and the second driving power PW2. Then, the power management unit 300 may provide the first mode change control signal MCS1 to the first control unit 110 and a second mode control signal MCS2 to the second control unit 210 according to the measured result values. In addition, the power management unit 300 may provide the second driving power PW2 to the first control unit 110 and the first driving power PW1 to the second control unit 210 according to the measured result values. The operation of providing the second driving power PW2 to the first control unit 110 and the operation of providing the first driving power PW1 to the second control unit 210 may be selectively performed.

The power management unit 300 will now be described in more detail by additionally referring to FIG. 3.

Figure 3:
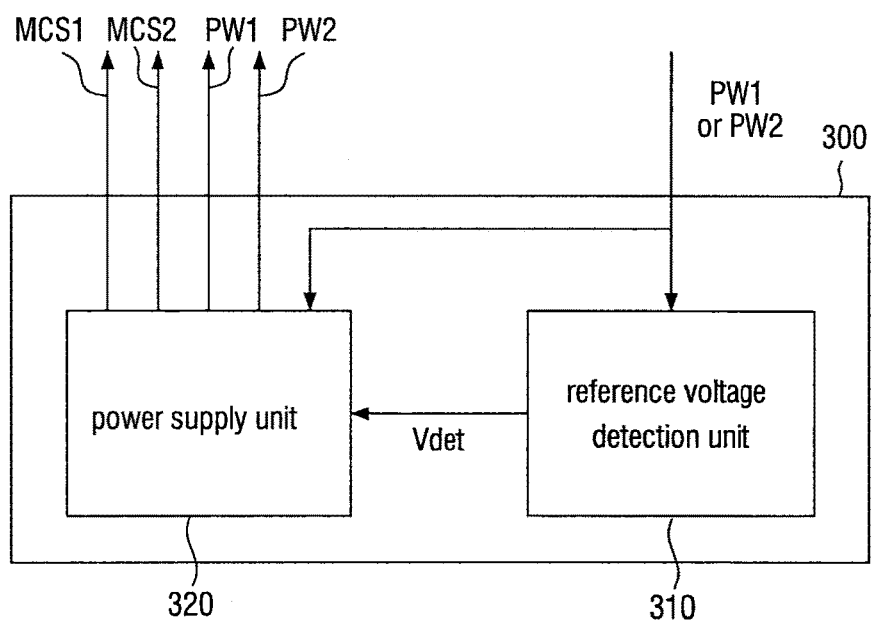
FIG. 3 is a detailed block diagram of to an embodiment of a power management unit.

FIG. 3 is a detailed block diagram of the power management unit 300 according to an exemplary embodiment.

Referring to FIG. 3, the power management unit 300 includes a reference voltage detection unit 310 and a power supply unit 320.

The reference voltage detection unit 310 may measure the voltage level of the first driving power PW1 received from the first control unit 110 and the voltage level of the second driving power PW2 received from the second control unit 210 and provide a reference voltage detection signal Vdet to the power supply unit 320 when at least one of the voltage level of the first driving power PW1 and the voltage level of the second driving power PW2 is higher than a reference voltage level. Here, the reference voltage level may be a minimum value of a voltage level sufficient to drive the display unit 400 normally and charge the first external device 11 or the second external device 12 connected as a device. Further, the reference voltage detection signal Vdet may provide information about which of the first driving power PW1 and the second driving power PW2 has a voltage level higher than the reference voltage level to the power supply unit 320.

The power supply unit 320 may receive the first driving power PW1 from the first control unit 110 and the second driving power PW2 from the second control unit 210 and distribute each of the first driving power PW1 and the second driving power PW2 to the first control unit 110 or the second control unit 210. That is, the power supply unit 320 may provide the first driving power PW1 received from the first control unit 110 to the second control unit 210 or the second driving power PW2 received from the second control unit 210 to the first control unit 110. However, the power supply unit 320 may operate only when receiving the reference voltage detection signal Vdet from the reference voltage detection unit 310. That is, when the reference voltage detection signal Vdet is not received from the reference voltage detection unit 310, in other words, when the voltage level of any one of the first driving power PW1 and the second driving power PW2 fails to reach the reference voltage level, the display unit 400 and the first external device 11 or the second external device 12 cannot be charged smoothly. Therefore, the power supply unit 320 may cut off the first driving power PW1 and the second driving power PW2 by not operating.

The power supply unit 320 may provide the first mode change control signal MCS1 to the first control unit 110 and the second mode change control signal MCS2 to the second control unit 210. The first mode change control signal MCS1 may control the first control unit 110 to operate in any one of a source mode or a sink mode, and the second mode change control signal MCS2 may control the second control unit 210 to operate in any one of the source mode and the sink mode.

Were, the source mode refers to a driving state in which the power management unit 300 provides the first driving power PW1 or the second driving power PW2 to the display unit 400 and provides or stands by to provide the second driving power PW2 or the first driving power PW1 to the first external device 11 or the second external device 12. The sink mode refers to a driving state in which the first external device 11 or the second external device 12 receives or stands by to receive the second driving power PW2 or the first driving power PW1 from the second external device 12 or the first external device 11, respectively.

In an exemplary embodiment, it is assumed that the first driving power PW1 having a voltage level higher than the reference voltage level is provided from the first control unit 110 to the reference voltage detection unit 310 and that the second driving power PW2 having a voltage level lower than the reference voltage level is or is not provided from the second control unit 210 to the reference voltage detection unit 310, for example. In this case, the reference voltage detection unit 310 may provide the power supply unit 320 with the reference voltage detection signal Vdet including information indicating that the first driving power PW1 has a voltage level higher than the reference voltage level. The power supply unit 320 receiving the reference voltage detection signal Vdet including the above information may provide the first driving power PW1 to the display unit 400 and the second control unit 210, provide the first mode change control signal MCS1 for controlling the first control unit 110 to operate in the source mode to the first control unit 110 and provide the second mode change control signal MCS2 for controlling the second control unit 210 to operate in the sink mode to the second control unit 210.

Accordingly, the display unit 400 may operate normally using the first driving power PW1 received from the power supply unit 320. In addition, the first control unit 110 receiving the first mode change control signal MCS1 for controlling to operate in the source mode may provide the first driving power PW1 to the display unit 400 through the power management unit 300 and provide or stand by to provide the first driving power PW1 to the second control unit 210 through the power management unit 300.

However, the first driving power source PW1 may not necessarily be provided to the display unit 400 and the second control unit 210 through the power supply unit 320, and can also be provided directly from the first control unit 110 to the display unit 400 and the second control unit 210.

In addition, the second control unit 210 provided with the second mode change control signal MCS2 for controlling to operate in the sink mode may receive the first driving power PW1 from the power management unit 300 and charge or stand by to charge the second external device 12 by providing the first driving power PW1 to the second external device 12 connected to the second control unit 210 through the second connector 220.

However, even when the first driving power PW1 is provided to the second control unit 210, whether the second external device 12 connected to the second control unit 210 through the second connector 220 will actually be charged with the first driving power PW1 may be determined based on the power control signal CTRL_PW used for information exchange between the first control unit 110 and the second control unit 210. That is, the power management unit 300 only determines whether each of the first driving power PW1 received from the first control unit 110 and the second driving power PW2 received from the second control unit 210 has a voltage level sufficient to drive the display unit 400 and the first external device 11 or the second external device 12 and informs the first control unit 110 and the second control unit 210 about the determination result in the form of the first mode change control signal MCS1 and the second mode change control signal MCS2. Whether each of the first external device 11 and the second external device 12 will operate as a host or a device or whether power transmission and reception of each of the first external device 11 and the second external device 12 to and from the first connector 120 or the second connector 220 will be cut off even when each of the first external device 11 and the second external device 12 does not operate as a host nor a device may be determined based on the power control signal CTRL_PW used to exchange information about negotiation between the first connector 120 and the first external device 11 and negotiation between the second connector 220 and the second external device 12.

Consequently, the first control unit 110 which controls the first connector 120 and the second control unit 210 which controls the second connector 220 can exchange information by exchanging the power control signal CTRL_PW with each other and simultaneously manage the first driving power PW1 and the second driving power PW2 using the power management unit 300. Therefore, whatever types of external devices are connected through the first connector 120 and the second connector 220, the first control unit 110 and the second control unit 210 can freely adjust and change the roles of the first external device 11 and the second external device 12 in real time.

Also, the first control unit 110 which controls the first connector 120 and the second control unit 210 which controls the second connector 220 can simultaneously manage the first image signal DATA1 and the second image signal DATA2 by sharing the image signal selection unit 500. Therefore, whatever types of image signals are provided through the first connector 120 and the second connector 220, which of the first external device 11 and the second external device 12 will provide an image signal to the display unit 400 can be adjusted in real time.

How the first driving power PW1 or the second driving power PW2 and the first image signal DATA1 or the second image signal DATA2 provided to the display unit 400 are displayed as an image will now be described in detail by additionally referring to FIG. 4.

Figure 4:
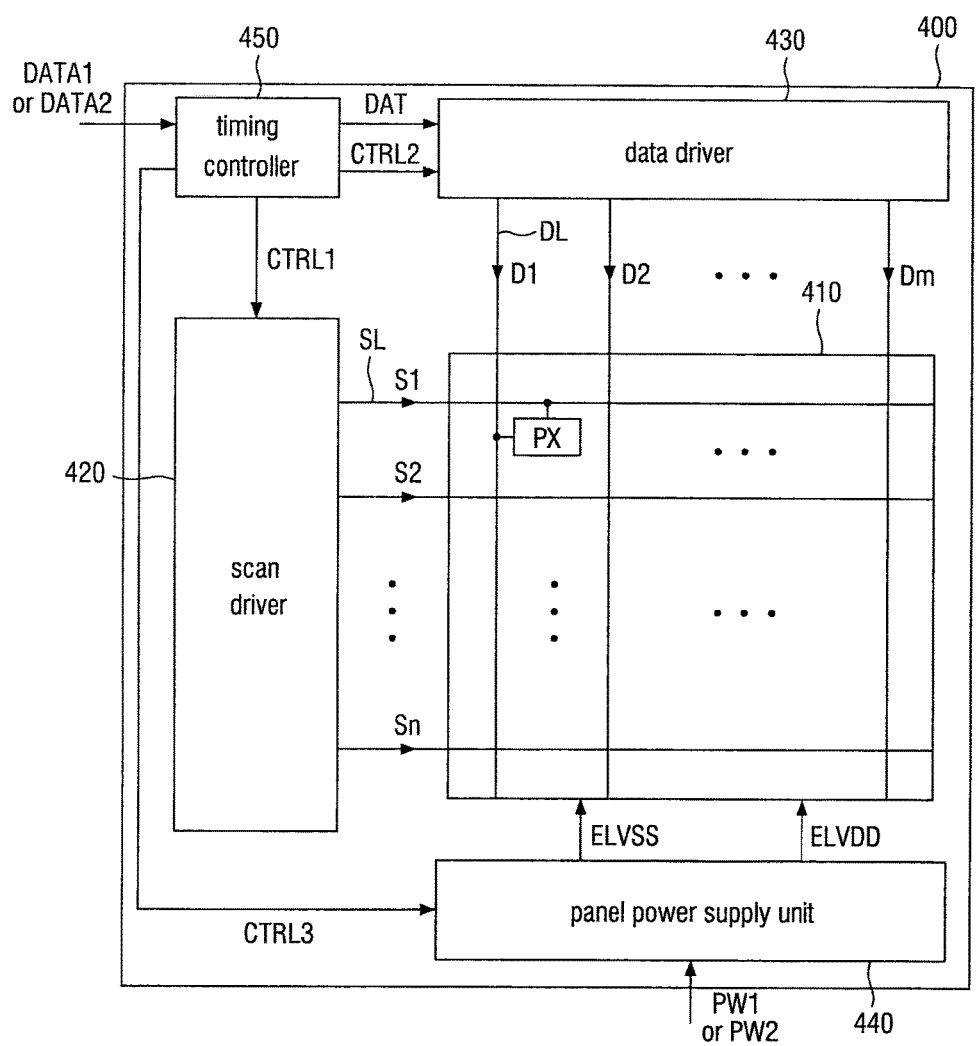
FIG. 4 is a detailed block diagram of an embodiment of a display unit.

FIG. 4 is a detailed block diagram of the display unit 400 according to an exemplary embodiment.

In the illustrated exemplary embodiment, an organic light-emitting display is exemplified as a type of the display unit 400. However, the invention is not limited thereto, and other types of display devices such as a liquid crystal display can also be used.

Referring to FIG. 4, the display unit 400 includes a display panel 410, a scan driver 420, a data driver 430, a panel power supply unit 440, and a timing controller 450.

The display panel 410 includes a plurality of scan lines SL, a plurality of data lines DL intersecting the scan lines SL, and a plurality of pixels PX. The scan line SL may be connected to the scan driver 420, and the data lines DL may be connected to the data driver 430. The display panel 410 may include n×m pixels PX located at the intersections of the scan lines SL and the data lines DL.

The scan driver 420 receives a scan driving control signal CTRL1 from the timing controller 450, generates a plurality of scan signals S1 to Sn, and sequentially transmits the scan signals S1 to Sn to the scan lines SL connected to the pixels PX.

The data driver 430 receives a data driving control signal CTRL2 from the timing controller 450, generates a plurality of data signals D1 to Dm, and provides the data signals D1 to Dm respectively to the data lines DL connected to the pixels PX.

The panel power supply unit 440 is driven by the first driving power PW1 or the second driving power PW2 received from the power management unit 300. In addition, the panel power supply unit 440 receives a power supply control signal CTRL3 from the timing controller 450 and generates a first power supply voltage ELVSS and a second power supply voltage ELVDD in response to the power supply control signal CTRL3. Also, although not illustrated in the drawing, the panel power supply unit 440 may provide power desired to drive the scan driver 420, the data driver 430 and the timing controller 450.

The timing controller 450 converts the first image signal DATA1 or the second image signal DATA2 received from the image signal selection unit 500 (refer to FIGS. 1 and 2) into an image data signal DAT and provides the image data signal DAT to the data driver 430. In response to the first image signal DATA1 or the second image signal DATA2, the timing controller 450 may generate the scan driving control signal CTRL1, the data driving control signal CTRL2 and the panel power supply control signal CTRL3 for controlling the scan driver 420, the data driver 430 and the panel power supply unit 440 and provide the scan driving control signal CTRL1, the data driving control signal CTRL2 and the panel power supply control signal CTRL3 to the scan driver 420, the data driver 430 and the panel power supply unit 440, respectively.

A power management method of the display device 1000 (refer to FIGS. 1 and 2) according to an exemplary embodiment will now be described with reference to FIGS. 5A and 5B.

Figure 5A:
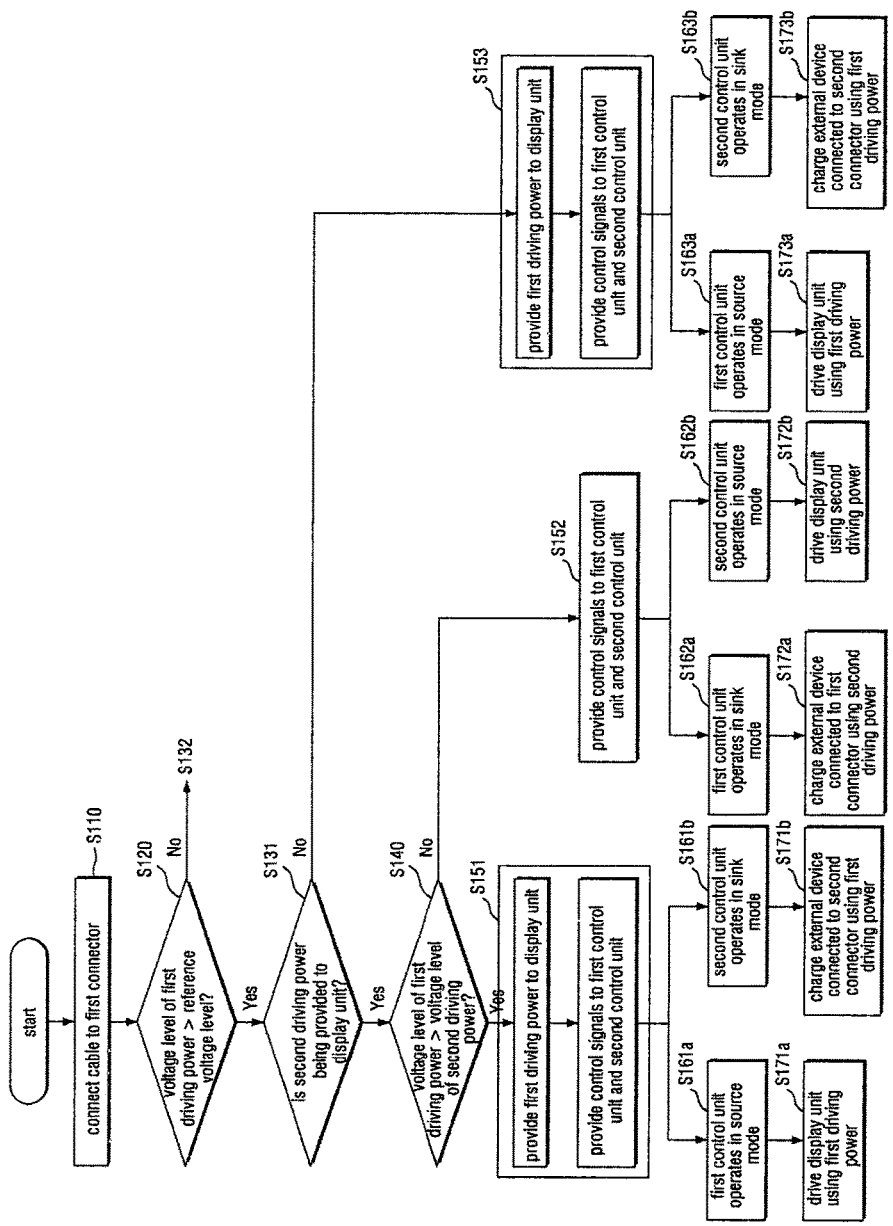
FIGS. 5A and 5B are flowcharts illustrating an embodiment of a power management method of a display device.
Figure 5B:
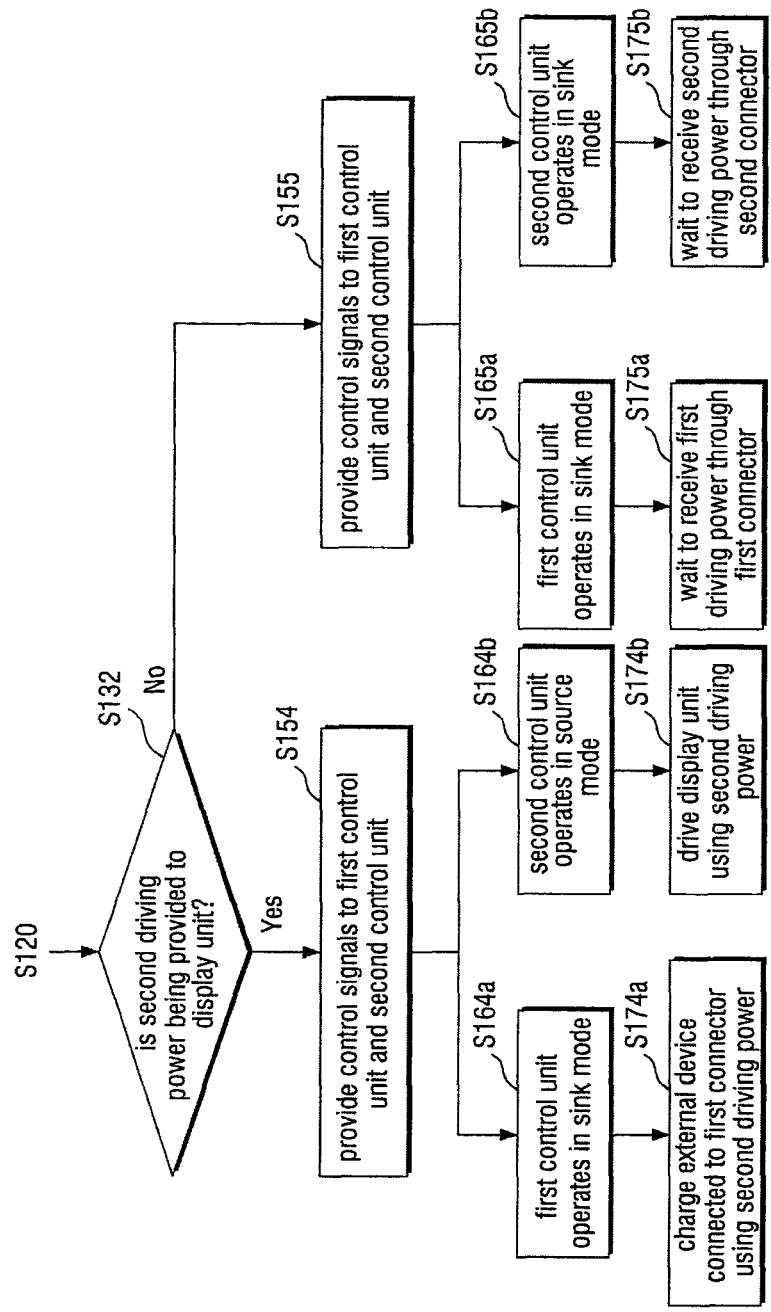

FIGS. 5A and 5B are flowcharts illustrating a power management method of a display device according to an exemplary embodiment.

FIGS. 5A and 5B are diagrams connected to each other. Since the flowchart blocks to be described are many, they will be described using different reference characters.

In FIGS. 5A and 5B, it is assumed that a cable is connected from an external device to the first connector 120, but the invention is not limited to this assumption. That is, even when a cable is connected from an external device to the second connector 220, power management can be performed in the same way and in the same process except for a difference due to the position of the first connector 120 and the position of the second connector 220.

Referring to FIGS. 1 to 4, 5A and 5B, a cable is connected to the first connector 120 (operation S110).

When a cable connected to the first external device 11 is connected to the first connector 120, it is determined whether the voltage level of the first driving power PW1 input to the first connector 120 is higher than a reference voltage level (operation S120).

Whether the voltage level of the first driving power PW1 is higher than the reference voltage level is determined first because the display unit 400 can be driven smoothly only when the voltage level of the first driving power PW1 is higher than the reference voltage level. In the illustrated exemplary embodiment, it is assumed that driving the display unit 400 smoothly using the first driving power PW1 provided by the first external device 11 connected to the first connector 120 has been set as a top priority. In this case, the reference voltage level may be defined as a minimum voltage level necessary for operating the display unit 400 as described above. That is, when charging the second external device 12 connected to the second connector 220 takes priority over providing the first driving power PW1 to the display unit 400, the reference voltage level may be changed to a voltage level necessary for charging the second external device 12. The reference voltage level can be changed by changing the settings of the first control unit 110 and the second control unit 210, for example, through a firmware update for the first control unit 110 and the second control unit 210.

When it is determined that the voltage level of the first driving power PW1 is higher than the reference voltage level, it is determined whether power is being provided from the second connector 220 to the display unit 400, that is, whether the second driving power PW2 is being provided to the display unit 400 (operation S131).

If the second driving power PW2 is already being provided from the second connector 220 to the display unit 400, the first driving power PW1 does not need to be provided to the display unit 400 to drive the display unit 400 even when the first driving power PW1 has a voltage level sufficient to drive the display unit 400. For this reason, it is determined whether the second driving power PW2 is being provided to the display unit 400. In the illustrated exemplary embodiment, which of the first driving power PW1 and the second driving power PW2 will be provided to the display unit 400 is determined based on the voltage levels of the first driving power PW1 and the second driving power PW2. However, the determination criterion can be changed according to the setting.

Accordingly, when it is determined that the second driving power PW2 is already being provided to the display unit 400, the voltage level of the first driving power PW1 and the voltage level of the second driving power PW2 are compared (operation S140).

If the voltage level of the first driving power PW1 is higher than that of the second driving power PW2, the display unit 400 being driven by the second driving power PW2 may come to be driven by the first driving power PW1, and the second external device 12 connected to the second control unit 210 through the second connector 220 may be charged with the first driving power PW1. To this end, the first driving power PW1 may be provided to the display unit 400, and control signals may be provided to the first control unit 110 and the second control unit 210 (operation S151). The control signals provided to the first control unit 110 and the second control unit 210 may be signals provided by the power management unit 300 or signals exchanged between the first control unit 110 and the second control unit 210. The control signals will be described later with reference to FIG. 6.

In response to the control signals, the first control unit 110 may operate in a source mode (operation S161a), and the second control unit 210 may operate in a sink mode (operation S161b). Accordingly, the display unit 400 may be driven by the first driving power PW1 (operation S171a), and the second external device 12 connected to the second control unit 210 through the second connector 220 may be charged with the first driving power PW1 (operation S171b).

As an example of the above operation, it may be assumed that an adapter having power supply as its primary role is connected to the first connector 120 while the display unit 400 is being driven by a device such as a notebook computer connected to the second connector 220. That is, while the notebook computer connected to the second connector 220 is consuming battery by driving the display unit 400, the adapter may be connected to another connector, i.e., the first connector 120 of the display device 1000. In this case, the display device 1000 may change the roles of the first connector 120 and the second connector 220 in real time. Accordingly, the display unit 400 may be driven by power supplied from the adapter, and the notebook computer may be charged with the power supplied from the adapter.

When the voltage level of the first driving power PW1 is lower than that of the second driving power PW2, the display unit 400 may be kept driven by the second driving power PW2, and the first external device 11 connected to the first control unit 110 through the first connector 120 may be charged with the second driving power PW2. To this end, control signals may be provided to the first control unit 110 and the second control unit 210 (operation S152). The control signals provided to the first control unit 110 and the second control unit 210 may be signals provided by the power management unit 300 or signals exchanged between the first control unit 110 and the second control unit 210. The control signals will be described later with reference to FIG. 7.

In response to the control signals, the first control unit 110 may operate in the sink mode (operation S162a), and the second control unit 210 may operate in the source mode (operation S162b). Accordingly, the first external device 11 connected to the first control unit 110 through the first connector 120 may be charged with the second driving power PW2 (operation S172a), and the display unit 400 may still be kept driven by the second driving power PW2 (operation S172b).

As an example of the above operation, it may be assumed that a notebook computer is connected to the first connector 120 while the display unit 400 is being driven by a device such as an adapter connected to the second connector 220. That is, while the adapter is driving the display unit 400, the notebook computer which can provide power sufficient to drive the display unit 400 but relatively smaller than the power provided by the adapter may be connected to the first connector 120. In this case, the notebook computer may be charged by the adapter. That is, the display device 1000 may determine, in real time, the roles of the first external device 11 and the second external device 12 based on the states of the first driving power PW1 and the second driving power PW2 provided through the first connector 120 and the second connector 220.

It may also be determined that the voltage level of the first driving power source PW1 is higher than the reference voltage level (operation S120) but that the second driving power PW2 is not being provided to the display unit 400 (operation S131).

In this case, the display unit 400 currently not being driven may be driven by the first driving power PW1, and the second control unit 210 may charge the second external device 12 connected to the second control unit 210 through the second connector 220 or stand by to immediately charge the second external device 12 when necessary. To this end, the first driving power PW1 may be provided to the display unit 400, and control signals may be provided to the first control unit 110 and the second control unit 210 (operation S153). The control signals provided to the first control unit 110 and the second control unit 210 may be signals provided by the power management unit 300 or signals exchanged between the first control unit 110 and the second control unit 210. The control signals will be described later with reference to FIG. 6.

In response to the control signals, the first control unit 110 may operate in the source mode (operation S163a), and the second control unit 210 may operate in the sink mode (operation S163b). Accordingly, the display unit 400 may be controlled by the first driving power PW1 (operation S173a), and the second external device 12 connected to the second control unit 210 through the second connector 220 may be charged by the first driving power PW1 (operation S173b).

As an example of the above operation, it may be assumed that in a state where no device or an external device such as a notebook computer that outputs insufficient power to drive the display unit 400 is connected to the second connector 220, an adapter or another external device that outputs sufficient power to drive the display unit 400 is connected to the first connector 120.

It may also be determined that the voltage level of the first driving power PW1 is lower than the reference voltage level (operation S120). In this case, it may additionally be determined whether the second driving power PW2 is being provided to the display unit 400 (operation S132).

If it is determined that the second driving power PW2 is being provided to the display unit 400 (operation S132), sufficient power is being supplied from the second external device 12 connected through the second connector 220 to the second control unit 210. Therefore, the first external device 11 connected to the first control unit 110 through the first connector 120 can also be charged with the second driving power PW2. To this end, control signals may be provided to the first control unit 110 and the second control unit 210 (operation S154). The control signals provided to the first control unit 110 and the second control unit 210 may be signals provided by the power management unit 300 or signals exchanged between the first control unit 110 and the second control unit 210. The control signals will be described later with reference to FIG. 7.

In response to the control signals, the first control unit 110 may operate in the sink mode (operation S164a), and the second control unit 210 may operate in the source mode (operation S164b). Accordingly, the first external device 11 connected to the first control unit 110 through the first connector 120 may be charged using the second driving power PW2 (operation S174a), and the display unit 400 may be kept driven by the second driving power PW2 (operation S174b). However, the invention is not limited to this case, and the first external device 11 may not be charged according to a control signal, i.e., the power control signal CTRL_PW exchanged between the first control unit 110 and the second control unit 210.

As an example of the above operation, it may be assumed that a notebook computer is connected to the first connector 120 while the display unit 400 is being driven by a device such as an adapter connected to the second connector 220. That is, while the adapter is driving the display unit 400, the notebook computer unable to provide sufficient power to drive the display unit 400 may be additionally connected to the first connector 120. In this case, the notebook computer may be charged by the adapter. That is, the display device 1000 may determine, in real time, the roles of the first external device 11 and the second external device 12 based on the states of the first driving power PW1 and the second driving power PW2 provided through the first connector 120 and the second connector 220.

It may also be determined that the voltage level of the first driving power source PW1 is lower than the reference voltage level (operation S120) and that the second driving power PW2 is not being provided to the display unit 400 (operation S132).

In this case, the display unit 400 is not being driven because the second driving power PW2 is not provided to the display unit 400. In addition, the voltage level of the first driving power PW1 provided through the first connector 120 is not sufficient to drive the display unit 400. Therefore, the first control unit 110 and the second control unit 210 may wait to receive sufficient power to drive the display unit 400. To this end, control signals may be provided to the first control unit 110 and the second control unit 210 (operation S155). The control signals provided to the first control unit 110 and the second control unit 210 may be signals provided by the power management unit 300 or signals exchanged between the first control unit 110 and the second control unit 210. The control signals will be described later with reference to FIG. 8.

In response to the control signals, the first control unit 110 may operate in the sink mode (operation S165a), and the second control unit 210 may also operate in the sink mode (operation S165b). Accordingly, no image may be displayed on the display unit 400 because the display unit 400 is not being driven. In addition, the first control unit 110 may wait to receive another first driving power PW1 through the first connector 120 (operation S175a), and the second control unit 210 may wait to receive another second driving power PW2 through the second connector 220 (operation S175b).

As an example of the above operation, it may be assumed that in a state where no device or an external device such as a notebook computer that outputs insufficient power to drive the display unit 400 is connected to the second connector 220, and an external device such as another notebook that outputs insufficient power to drive the display unit 400 is additionally connected to the first connector 120.

The process of controlling the first control unit 110 and the second control unit 210 described above with reference to FIGS. 5A and 5B will now be described.

Figure 6:
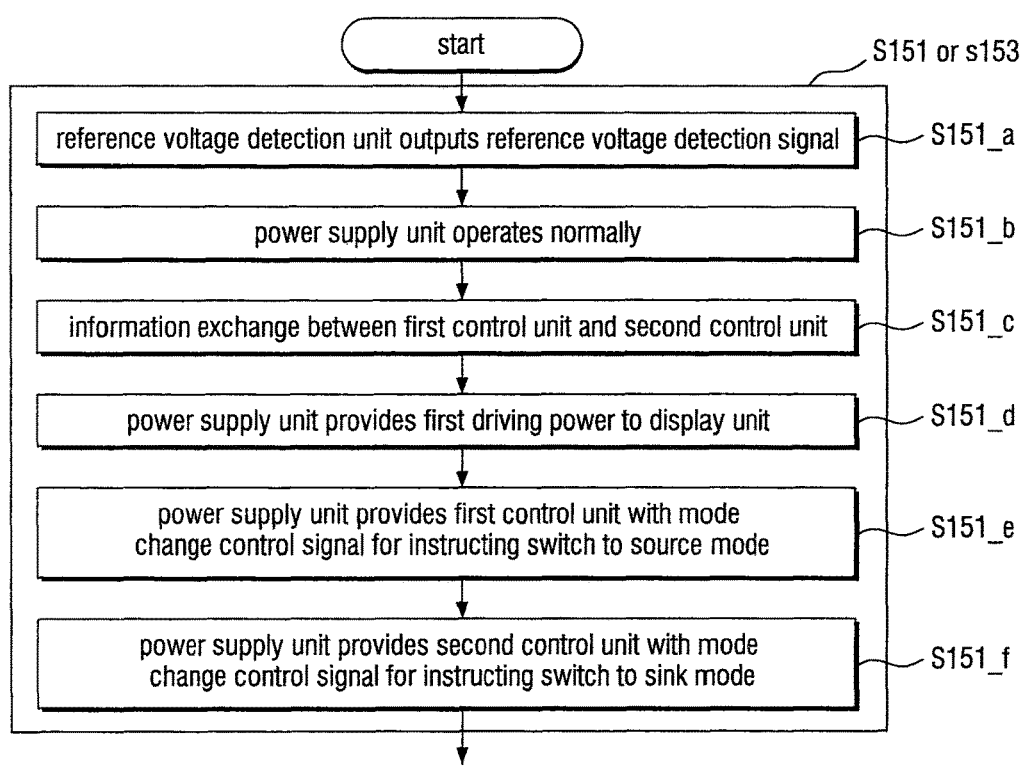
FIG. 6 is a detailed flowchart illustrating a method of providing first driving power to the display unit and providing control signals to a first control unit and a second control unit in FIGS. 5A and 5B.
Figure 7:
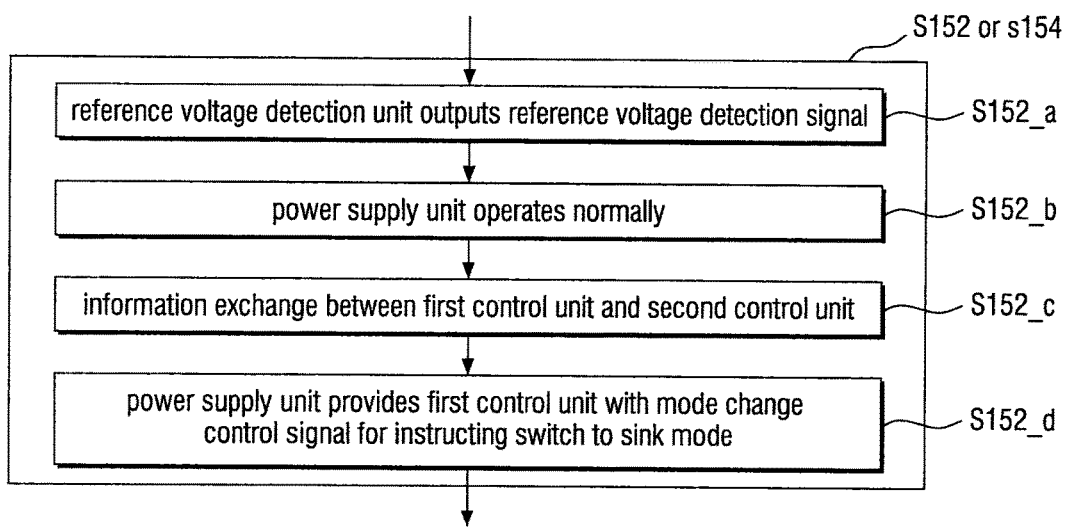
FIG. 7 is a detailed flowchart illustrating another method of providing control signals to the first control unit and the second control unit in FIGS. 5A and 5B.
Figure 8:
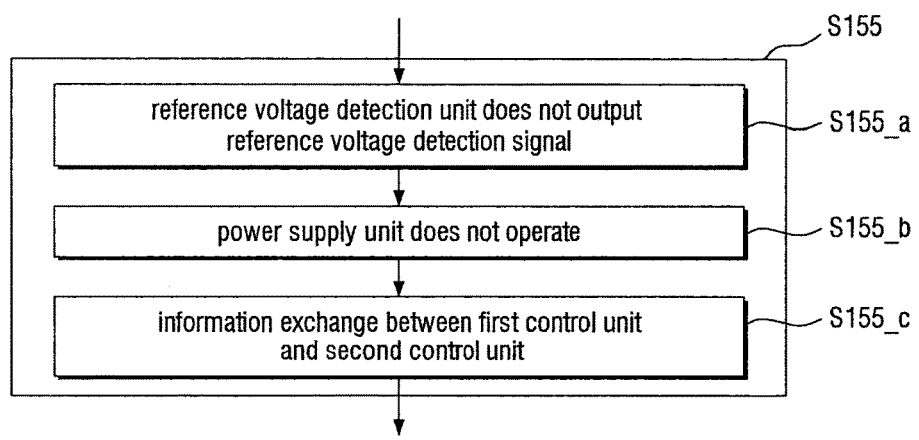
FIG. 8 is a detailed flowchart illustrating another method of providing control signals to the first control unit and the second control unit in FIGS. 5A and 5B.

FIG. 6 is a detailed flowchart illustrating a method of providing the first driving power PW1 to the display unit 400 (refer to FIGS. 1, 2 and 4) and providing control signals to the first control unit 110 (refer to FIGS. 1 and 2) and the second control unit 210 (refer to FIGS. 1 and 2) in FIGS. 5A and 5B. FIG. 7 is a detailed flowchart illustrating another method of providing control signals to the first control unit 110 and the second control unit 210 in FIGS. 5A and 5B. FIG. 8 is a detailed flowchart illustrating another method of providing control signals to the first control unit 110 and the second control unit 210 in FIGS. 5A and 5B.

Specifically, FIG. 6 is a detailed flowchart illustrating operations S151 and S153 of FIGS. 5A and 5B. In addition, FIG. 7 is a detailed flowchart illustrating operations S152 and S154 of FIGS. 5A and 5B, and FIG. 8 is a detailed flowchart illustrating operation S155 of FIGS. 5A and 5B.

Referring to FIGS. 1 to 4 and 6, the reference voltage detection unit 310 may output to the power supply unit 320 the reference voltage detection signal Vdet indicating that the first driving power PW1 having a voltage level higher than the reference voltage level has been input (operation S151_a). Accordingly, the power supply unit 320 may operate normally in response to the reference voltage detection signal Vdet (operation S151_b).

Next, the first control unit 110 and the second control unit 210 may share the result of negotiation between the first control unit 110 and the first external device 11 and the result of negotiation between the second control unit 210 and the second external device 12 by exchanging the power control signal CTRL_PW (operation S151_c).

Then, the power supply unit 320 may provide the first driving power PW1 to the display unit 400 (operation S151_d).

Next, the power supply unit 320 may output the first mode change control signal MCS1 for changing the operation mode of the first control unit 110 to the source mode (operation S151_e) and the second mode change control signal MCS2 for changing the operation mode of the second control unit 210 to the sink mode (operation S151_f). However, the operation mode of the first control unit 110 is not necessarily changed to the source mode in response to the first mode change control signal MCS1 but may be determined according to information included in the power control signal CTRL_PW exchanged between the first control unit 110 and the second control unit 210.

Referring to FIG. 7, the reference voltage detector 310 may output to the power supply unit 320 the reference voltage detection signal Vdet indicating that the first driving power PW1 having a voltage level higher than the reference voltage level has been input (operation S152_a). Accordingly, the power supply unit 320 may operate normally in response to the reference voltage detection signal Vdet (S152_b).

Next, the first control unit 110 and the second control unit 210 may share the result of negotiation between the first control unit 110 and the first external device 11 and the result of negotiation between the second control unit 210 and the second external device 12 by exchanging the power control signal CTRL_PW (operation S152_c).

Then, the power supply unit 320 may output to the first control unit 110 the first mode change control signal MCS1 for changing the operation mode of the first control unit 110 to the sink mode (S152_d).

That is, since it is not necessary to provide the first driving power PW1 to the display unit 400, the procedure related to the provision of the first driving power PW1 can be omitted, unlike in the method of FIG. 6.

Referring to FIG. 8, the reference voltage detection unit 310 may not output the reference voltage detection signal Vdet (operation S155_a). Accordingly, the power supply unit 320 may not operate (operation S155_b).

Therefore, the first control unit 110 and the second control unit 210 may share the result of negotiation between the first control unit 110 and the first external device 11 and the result of negotiation between the second control unit 210 and the second external device 1 by exchanging the power control signal CTRL_PW (operation S155_c). However, other procedures may not be performed.

Until now, the management of the first driving power PW1 provided through the first connector 120 has been described with reference to FIGS. 5 through 8. The management of the first image signal DATA1 provided through the first connector 120 will hereinafter be described with reference to FIG. 9.

Figure 9:
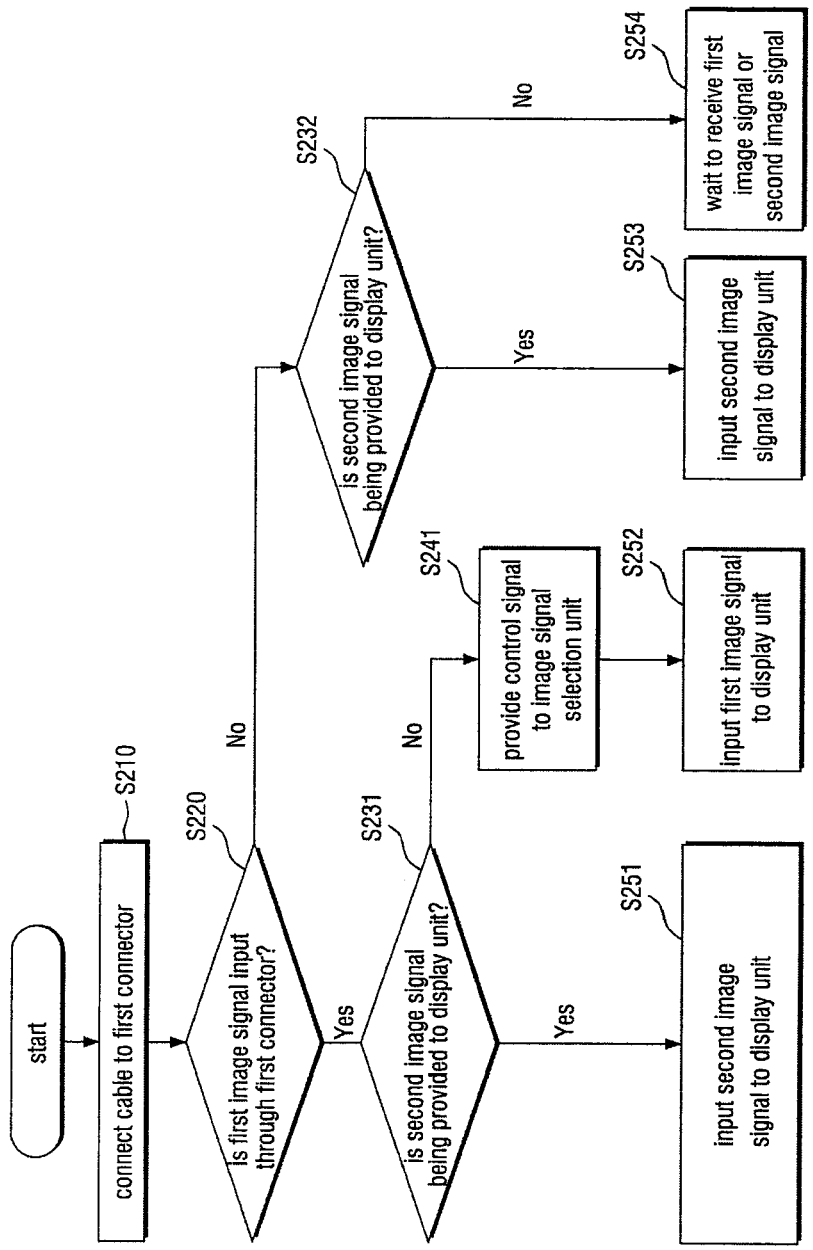
FIG. 9 is a flowchart illustrating an embodiment of a method of managing image signals of a display device.

FIG. 9 is a flowchart illustrating a method of managing image signals of a display device according to an exemplary embodiment.

Referring to FIGS. 1 to 4 and 9, it is assumed that a cable is connected from an external device to the first connector 120, but the invention is not limited to this assumption. That is, even when a cable is connected from an external device to the second connector 220, power management may be performed in the same way and in the same process except for a difference due to the position of the first connector 120 and the position of the second connector 220.

Referring to FIGS. 1 to 4 and 9, a cable is connected to the first connector 120 (operation S210).

When a cable connected to the first external device 11 is connected to the first connector 120, it is determined whether the first image signal DATA1 is provided from the first external device 11 through the first connector 120 (operation S220).

Here, when it is determined that the first image signal DATA1 is provided through the first connector 120 (operation S220), it is additionally determined whether the second image signal DATA2 is being provided to the display unit 400 (operation S231).

Although the first image signal DATA1 is provided through the first connector 120, when the second image signal DATA2 is already being provided to the display unit 400 through the second connector 220, the display unit 400 may keep displaying an image corresponding to the second image signal DATA2 (operation S251). However, this can be changed by the settings, and an additional screen for asking whether an image corresponding to the first image signal DATA1 will be displayed can appear on the display unit 400.

While the first image signal DATA1 is provided through the first connector 120 (operation S220), when the second image signal DATA2 is not being provided to the display unit 400 (operation S231), a control signal may be provided to the image signal selection unit 500 (operation S241).

Here, the control signal provided to the image signal selection unit 500 may be the image selection control signal CTRL_DP described above. Specifically, the first control unit 110 may provide the first image signal DATA1 to the image signal selection unit 500 and transmit the image selection control signal CTRL_DP for requesting the display of the first image signal DATA1 on the display unit 400 to the image signal selection unit 500 at the same time as providing the first image signal DATA1 to the image signal selection unit 500. Accordingly, the first image signal DATA1 may be provided to the display unit 400 through the image signal selection unit 500 (operation S252), and an image corresponding to the first image signal DATA1 may be displayed on the display unit 400.

If it is determined that the first image signal DATA1 is not provided through the first connector 120 (operation S220), it may be additionally determined whether the second image signal DATA2 is being provided to the display unit 400 (operation S232).

Here, when it is determined that the second image signal DATA2 is being provided to the display unit 400, the display unit 400 may keep receiving the second image signal DATA2 (operation S253).

When it is determined that the second image signal DATA2 is not being provided to the display unit 400 (operation S232), each of the first control unit 110 and the second control unit 210 may wait to receive the first image signal DATA1 or the second image signal DATA2 because none of the first image signal DATA1 and the second image signal DATA2 is provided to the display unit 400 (operation S254).

The order in which the first image signal DATA1 and the second image signal DATA2 are selected is not limited to the order illustrated in the drawing, and the order of some of the determination operations can be reversed.

In addition, the power management method described above with reference to FIGS. 5 through 8 and the image signal management method described above with reference to FIG. 9 can be determined individually as described above. That is, one external device can be charged at the same time as providing an image signal.

Figure 10:
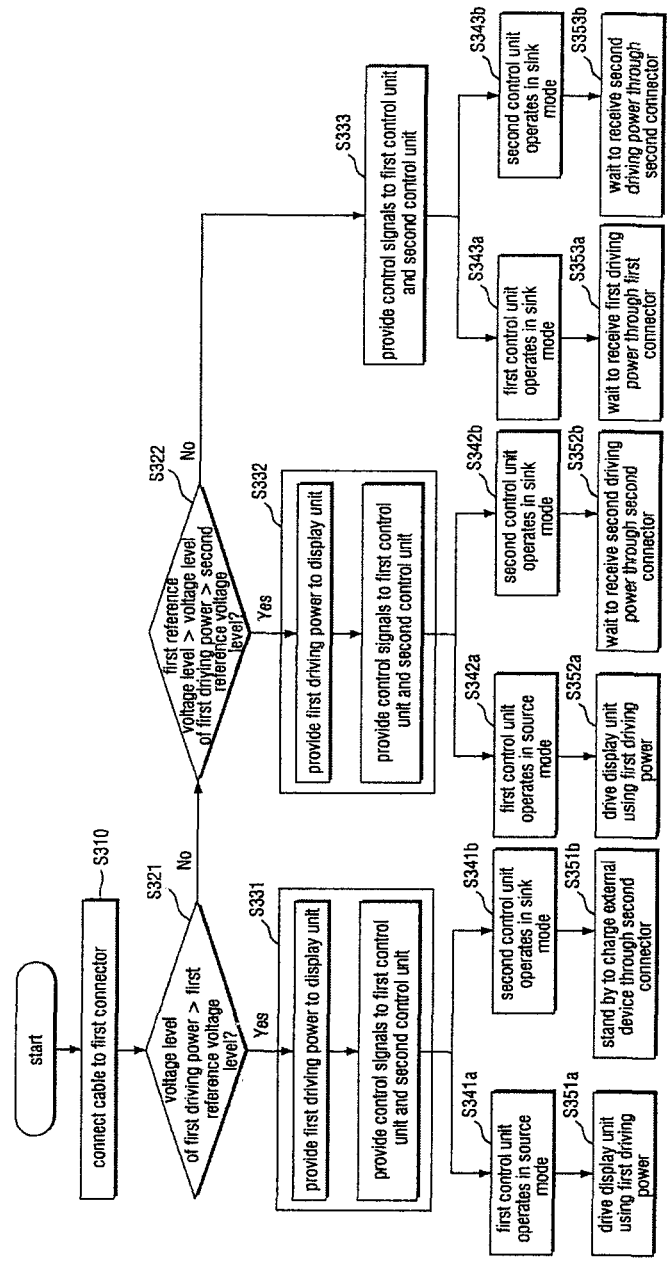
FIG. 10 is a flowchart illustrating an embodiment of a power management method of a display device.

FIG. 10 is a flowchart illustrating a power management method of a display device according to an exemplary embodiment.

The power management method of the display device 1000 (refer to FIGS. 1 and 2) according to the illustrated exemplary embodiment is different from the power management method of the display device 1000 according to the exemplary embodiment of FIGS. 5A and 5B in that a reference voltage level is divided into a first reference voltage level and a second reference voltage level and that it is not determined, for ease of description, whether the second driving power PW2 (refer to FIG. 2) is being provided to the display unit 400 (refer to FIGS. 1, 2 and 4). Therefore, a description of reference characters and elements identical to those described above will be omitted, and differences between the current and previous exemplary embodiments will mainly be described.

Referring to FIGS. 1 to 4 and 10, when a cable is connected to the first connector 120 (operation S310), it is determined whether the voltage level of the first driving power PW1 provided through the first connector 120 is higher than the first reference voltage level (operation S321).

Here, the first reference voltage level denotes a minimum value of a voltage level that is sufficient to drive the display unit 400 and charge the second external device 12 connected through the second connector 220.

If it is determined that the voltage level of the first driving power PW1 is higher than the first reference voltage level (operation S321), the first driving power PW1 is provided to the display unit 400, and control signals are provided to the first control unit 110 and the second control unit 210 (operation S331). Accordingly, the first control unit 110 may operate in the source mode (operation S341a), and the display unit 400 may be driven by the first drive power PW1 (operation S351a). In addition, the second control unit 210 may operate in the sink mode (operation S341b) and charge the second external device 12 through the second connector 220 or stand by to charge the second external device 12 (operation S351b).

When it is determined that the voltage level of the first driving power PW1 provided through the first connector 120 is not higher than the first reference voltage level (operation S321), it is additionally determined whether the voltage level of the first driving power PW1 is lower than the first reference voltage level but higher than the second reference voltage level (operation S322).

Here, the second reference voltage level denotes a minimum value of a voltage level that is sufficient to drive the display unit 400 but not sufficient to charge the second external device 12 connected through the second connector 220.

If it is determined that the voltage level of the first driving power PW1 is higher than the second reference voltage level (operation S322), the first driving power PW1 is provided to the display unit 400, and control signals are provided to the first control unit 110 and the second control unit 210 (operation S332). Accordingly, the first control unit 110 may operate in the source mode (operation S342a), and the display unit 400 may be driven by the first driving power PW1 (operation S352a). Also, the second control unit 210 may operate in the sink mode (operation S342b) and wait to receive another second driving power PW2 through the second connector 220 (operation S352b).

If it is determined that the voltage level of the first driving power PW1 provided through the first connector 120 fails to reach the second reference voltage level (operation S322), control signals are provided to the first control unit 110 and the second control unit 210 (operation S333). Accordingly, the first control unit 110 may operate in the sink mode (operation S343a) and wait to receive the first driving power PW1 through the first connector 120 (operation S353a). Also, the second control unit 210 may operate in the sink mode (operation S343b) and wait to receive the second driving power PW2 through the second connector 220 (operation S353b).

However, the invention is not limited to the above case, and when it is not a priority to drive the display unit 400, that is, when it is a priority to charge the second external device 12 connected to the second connector 220 instead of driving the display unit 400, the power management method can be changed accordingly.

Figure 11:
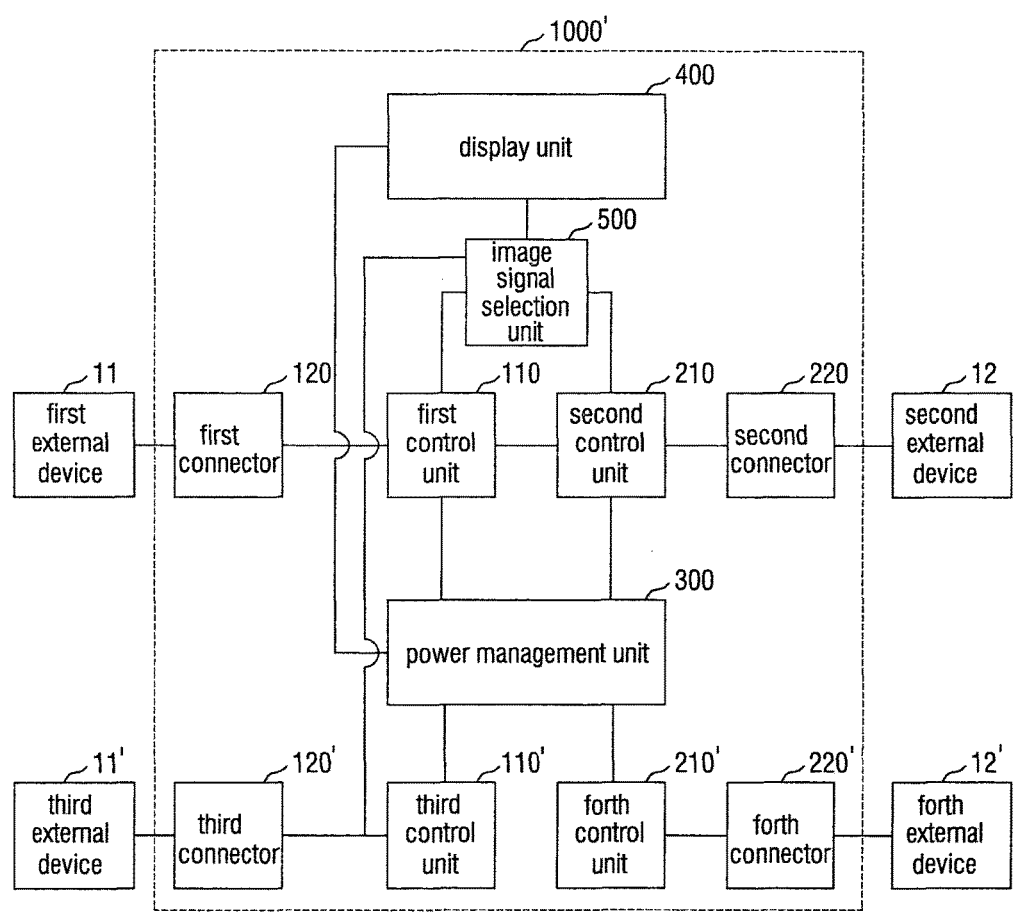
FIG. 11 is a block diagram of an embodiment of a display device further including third and fourth connectors.

FIG. 11 is a block diagram of a display device 1000' according to an exemplary embodiment.

Referring to FIG. 11, the display device 1000' includes a third connector 120' which receives a third image signal DATA3 or third driving power PW3 and a fourth connector 220' which receives various external signals. Other features of the display device 1000' are similar to those of the display device 1000 of FIGS. 1 and 2, and thus a description of the features will be omitted.

In an exemplary embodiment, the third connector 120' may conform to the USB standard, and the display unit 400 may display an image corresponding to at least one of the first through third image signals DATA1 to DATA3 and may be driven by at least one of the first through third driving power PW1 to PW3.

In an exemplary embodiment, the fourth connector 220' may be different from the USB standard, and the external signals provided through the fourth connector 220' may not affect the driving of the display unit 400.

While a display device having four connectors such as the first connector 120, the second connector 220, the third connector 120' and the fourth connector 220' has been described herein, the number of connectors is not limited to four but can be five or more. That is, a display device having three or more connectors can also be driven to set, in real time, the role of an external device connected to each connector for the transmission/reception of an image signal or driving power of the external device.

According to exemplary embodiments, it is possible to provide a display device including a plurality of connectors and capable of being driven in real time in such a way that various types of image signals or driving power provided simultaneously through the connectors do not collide with each other, and a method of driving the display device.

However, the effects of the invention are not restricted to the one set forth herein. The above and other effects of the invention will become more apparent to one of ordinary skill in the art to which the invention pertains by referencing the claims.

What is claimed is:

1. A display device comprising:
    a first connector which receives a first image signal and first driving power;
    a second connector which receives a second image signal and second driving power;
    a first control unit which processes the first image signal and the first driving power provided through the first connector;
    a second control unit which processes the second image signal and the second driving power provided through the second connector;
    a power management unit which receives the first driving power and the second driving power from the first control unit and the second control unit, measures the first driving power and the second driving power, and provides information about the first driving power and information about the second driving power to the first control unit and the second control unit; and
    a display unit which receives one of the first image signal and the second image signal from one of the first control unit and the second control unit and displays one of the first image signal and the second image signal.

2. The display device of claim 1, wherein when the first driving power having a voltage level sufficient to drive the display unit is provided through the first connector, the display unit is driven by the first driving power, and the second control unit receives the first driving power and provides the first driving power to the second connector.

3. The display device of claim 2, wherein when the first image signal is provided through the first connector and when no image signal is provided to the second connector, the display unit displays an image corresponding to the first image signal.

4. The display device of claim 2, wherein when the second image signal is provided through the second connector and when no image signal is provided to the first connector, the display unit displays an image corresponding to the second image signal.

5. The display device of claim 1, wherein the power management unit comprises a reference voltage detection unit and a power supply unit, wherein the reference voltage detection unit provides a reference voltage detection signal to the power supply unit when a voltage level of at least one of the first driving power and the second driving power is higher than that of a reference voltage, and the power supply unit, when receiving the reference voltage detection signal, provides one of the first driving power and the second driving power having a voltage level higher than that of the reference voltage to the display unit and the first control unit or the second control unit.

6. The display device of claim 5, wherein the voltage level of the reference voltage is a minimum voltage level desired to operate the display unit.

7. The display device of claim 5, wherein the reference voltage comprises a first reference voltage and a second reference voltage, wherein a voltage level of the first reference voltage is defined as a voltage level which is able to operate the display unit and charge an external device connected to the second control unit, and a voltage level of the second reference voltage is defined as a voltage level which is able to operate the display unit but is not able to charge the external device connected to the second control unit.

8. The display device of claim 1, further comprising an image signal selection unit which receives the first image signal and the second image signal from the first control unit and the second control unit and provides one of the first image signal and the second image signal to the display unit.

9. The display device of claim 8, wherein the first control unit provides an image selection control signal to the image signal selection unit, and the image signal selection unit provides the first image signal or the second image signal to the display unit according to a voltage level of the image selection control signal.

10. The display device of claim 1, wherein the first image signal and the first driving power are provided to the first connector through one cable.

11. The display device of claim 1, wherein the first connector and the second connector are connectors conforming to a universal serial bus standard.

12. A display device comprising:
    a first connector which receives a first image signal and first driving power from a first external device;
    a second connector which receives a second image signal and second driving power from a second external device;
    a display unit which displays an image corresponding to one of the first image signal and the second image signal,
    wherein the first connector and the second connector conform to a universal serial bus standard, and the display unit is driven by the first driving power or the second driving power, and
    wherein a driving power supply test is performed through at least one of the first and second connectors to determine whether the corresponding first or second external device connected thereto will function as a host or a device to supply or receive the first driving power or second driving power.

13. The display device of claim 12, wherein the display unit is not provided with power other than at least one of the first driving power and the second driving power.

14. The display device of claim 12, further comprising at least one third connector which receives a third image signal or third driving power,
    wherein the third connector conforms to the universal serial bus standard, and the display unit displays an image corresponding to at least one of the first through third image signals and is driven by at least one of the first through third driving power.

15. The display device of claim 12, further comprising a fourth connector which receives various external signals,
wherein the fourth connector is different from the universal serial bus standard, and the external signals provided through the fourth connector do not affect the driving of the display unit.

16. A method of driving a display device comprising a first connector, a second connector and a display unit, the method comprising:
receiving an image signal and driving power through each of the first connector and the second connector;
measuring a voltage level of the driving power;
providing the driving power to the display unit and one of the first and second connectors to which the driving power has not been provided when the voltage level of the driving power is higher than a reference voltage level; and
providing the image signal provided from one of the first connector and the second connector to the display unit.

17. The method of claim 16, wherein in the providing the driving power to the display unit and the one of the first and second connectors, when the driving power having a voltage level higher than the reference voltage level is provided through the first connector, the driving power is provided to the display unit at the same time as being additionally provided to an external device connected to the second connector.

18. The method of claim 16, wherein in the providing the driving power to the display unit and the one of the first and second connector, when the voltage level of the driving power is higher than the reference voltage level, the driving power is provided to the display unit and provided to one of the first and second connectors to which the driving power has not been provided through information exchange between a first control unit which controls the first connector and a second control unit which controls the second connector.

19. The method of claim 16, wherein the measuring the voltage level of the driving power and the providing the driving power to the display unit and the one of the first and second connectors are able to be performed independently of the providing the image signal provided from the one of the first connector and the second connector to the display unit.

20. The method of claim 16, wherein each of the first connector and the second connector is a connector which receives the image signal and provides or receives the driving power according to a universal serial bus standard.

* * * * *